United States Patent
Wakisaka et al.

(10) Patent No.: US 7,289,034 B2
(45) Date of Patent: Oct. 30, 2007

(54) SENSOR DRIVE CONTROL METHOD AND SENSOR-EQUIPPED RADIO TERMINAL DEVICE

(75) Inventors: Yoshihiro Wakisaka, Kokubunji (JP); Shunzo Yamashita, Musashino (JP); Toshiyuki Odaka, Fuchu (JP); Norio Ohkubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 11/072,402

(22) Filed: Mar. 7, 2005

(65) Prior Publication Data
US 2006/0113844 A1 Jun. 1, 2006

(30) Foreign Application Priority Data
Nov. 16, 2004 (JP) .............................. 2004-331337

(51) Int. Cl.
*G08B 21/00* (2006.01)
(52) U.S. Cl. ................... 340/667; 340/666; 340/686.1; 340/693.3; 307/112
(58) Field of Classification Search ................ 340/667
See application file for complete search history.

(56) References Cited

U.S. PATENT DOCUMENTS 5,229,653 A * 7/1993 Lamarche .................. 307/116
6,559,653 B2 * 5/2003 Macke et al. ............... 340/654
2005/0099289 A1 * 5/2005 Arita et al. .............. 340/539.1

FOREIGN PATENT DOCUMENTS

JP  2003-016566  1/2003

* cited by examiner

Primary Examiner—Benjamin C. Lee
Assistant Examiner—Eric M. Blount
(74) Attorney, Agent, or Firm—Antonelli, Terry, Stout & Kraus, LLP.

(57) ABSTRACT

A radio terminal device realizing reduced power consumption and prompt detection of detection object by using a first sensor and a second sensor whose ON/OFF states are opposite and whose operations are synchronized. When the first sensor detects a detection object, the first output voltage level is changed. When a processor detects the change of the output voltage level as an interrupt signal, the drive voltage level of the first sensor is switched to low and the drive voltage level of the second sensor is switched to high. Moreover, when the second sensor detects a detection object, the output voltage level of the second sensor is changed. When the processor detects the change of the output voltage level as an interrupt signal, the drive voltage level of the second sensor is switched to low and the drive voltage level of the first circuit is switched to high.

8 Claims, 13 Drawing Sheets

SENSOR DRIVE CONTROL METHOD AND SENSOR-EQUIPPED RADIO TERMINAL DEVICE

INCORPORATION BY REFERENCE

The present application claims priority from Japanese application JP 2004-331337 filed on Nov. 16, 2004, the content of which is hereby incorporated by reference into this application.

BACKGROUND OF THE INVENTION

The present invention relates to a sensor-equipped radio terminal device.

Conventionally, the device for detecting an object to be detected has been used in an environment supplied with power all the time. Accordingly, there has been no problem in consuming a large amount of power. However, when the device for detecting a detection object all the time is made with a small size for wireless use, for example, a battery is arranged as a power source and the battery service life makes it difficult to supply a large amount of power all the time.

To cope with this, there is considered a method for operating intermittently instead of continuous operation of the device detecting a detection object. When the device detecting a detection object performs intermittent operation, the device is in a wait state during a non-operation period, i.e., the device can suppress power consumption during that period as compared to the normal operation period, thereby reducing the entire power consumption.

A device for suppressing power consumption by intermittent detection is disclosed in JP-A-2003-16566. That is, a first switch connected to a detection unit is turned ON at a predetermined time interval and a second switch is turned ON only if the detection signal value exceeds a threshold value, thereby performing a radio transmission.

When suppressing the power consumption by using the intermittent operation, the interval between the intermittent operation should be as long as possible. However, as the interval between the intermittent operations is increased, the detection of a detection object is delayed.

Moreover, in order to reduce the delay of the detection of the detection object during intermittent operation, the interval between the intermittent operations should be reduced. That is, in the intermittent operation of the device for detecting a detection object, the power consumption and the detection response are in the trade-off relationship.

SUMMARY OF THE INVENTION

It is therefore an object of the present invention to suppress both of the power consumption required for detecting a detection object and the delay of the detection. For this, the battery is made smaller and can have a longer service life.

The present invention includes: a normally-closed switch and a normally-open switch for detecting presence/absence of a contact or a weight; a switch circuit for detecting an electrical connection by a switch; a processor for supplying drive voltage to the switch circuit and detecting a change of output voltage from the switch circuit; a radio transmission/reception unit controlled by the processor so as to perforMr./Ms.adio transmission/reception of a signal; and a power source unit for supplying power to the processor and the radio transmission/reception unit.

The open/close operations of the normally-closed switch and the normally-open switch are opposite and the open/close operations are synchronized. When the normally-closed switch detects presence/absence of a contact or weight, this changes the output voltage level of the normally-closed switch. When the processor detects the output voltage level change as an interrupt signal, the drive voltage level of the normally-closed switch circuit is switched from high to low while the drive voltage level of the normally-open switch circuit is switched from low to high.

Moreover, when the normally-open switch detects presence/absence of a contact or weight, this changes the output voltage level of the normally-open switch. When the processor detects the output voltage level change as an interrupt signal, the drive voltage level of the normally-open switch circuit is switched from high to low while the drive voltage level of the normally-closed switch circuit is switched from low to high. Thus, it is possible to detect presence/absence of a contact of weight at an arbitrary timing.

The present invention realizes both of reduction of power consumption and the prompt detection of a detection object in detecting a detecting object. For this, it is possible to reduce the size of a power source (such as a battery) of the device and increase the service life of the power source.

Other objects, features and advantages of the invention will become apparent from the following description of the embodiments of the invention taken in conjunction with the accompanying drawings.

DESCRIPTION OF THE EMBODIMENTS

According to the method of the present invention, when a detection object should be detected once in 30 minutes or so, and the detection device should be arranged at a place where it is difficult to assure a large amount of power all the time, or the detection device should reduce its size, or the detection device should be wireless, it is possible to realize low power consumption while maintaining prompt detection only by increasing several number of parts in the device for detecting a detection object.

Embodiment 1

Figure 1:
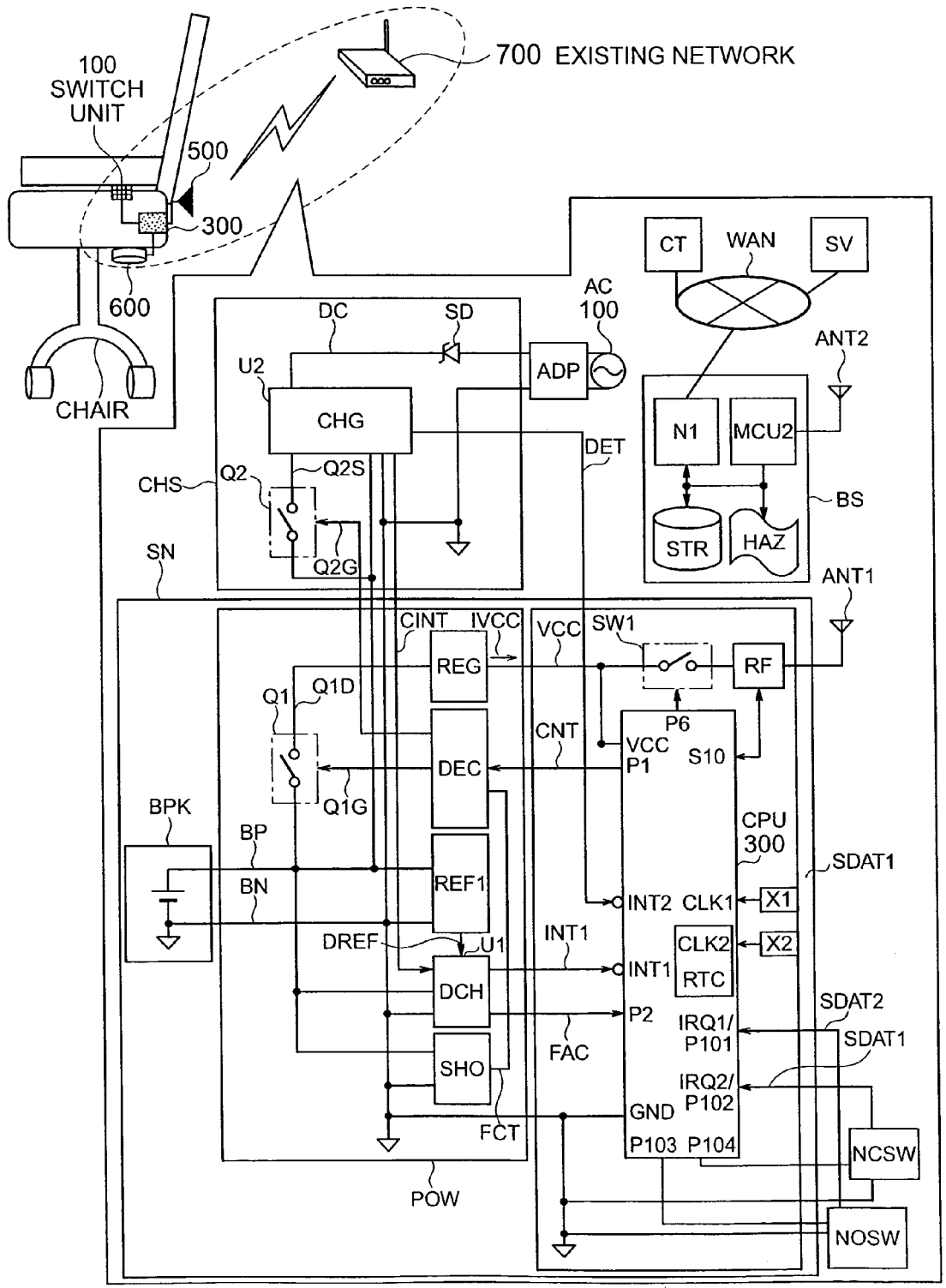
FIG. 1 shows a first embodiment of the present invention.

FIG. 1 shows a first embodiment of the present invention. In the first embodiment, a switch for detecting a weight or a contact is used as a sensor. Hereinafter, in the first embodiment, the sensor-equipped radio terminal device is explained as a switch-equipped radio terminal device. FIG. 1 shows a switch unit 100 attached in a seat of a chair so as to judge whether a person is seated or not. In the first embodiment, in addition to the switch unit, a microcomputer unit 300, a radio transmission/reception unit 500, and a power source unit 600 are attached to the chair. Data transmitted from the radio transmission/reception unit 500 is received by an existing network 700. The balloon in this figure shows the configuration of the first embodiment in a block diagram. This portion will be detailed later with reference to FIG. 7.

Figure 2:
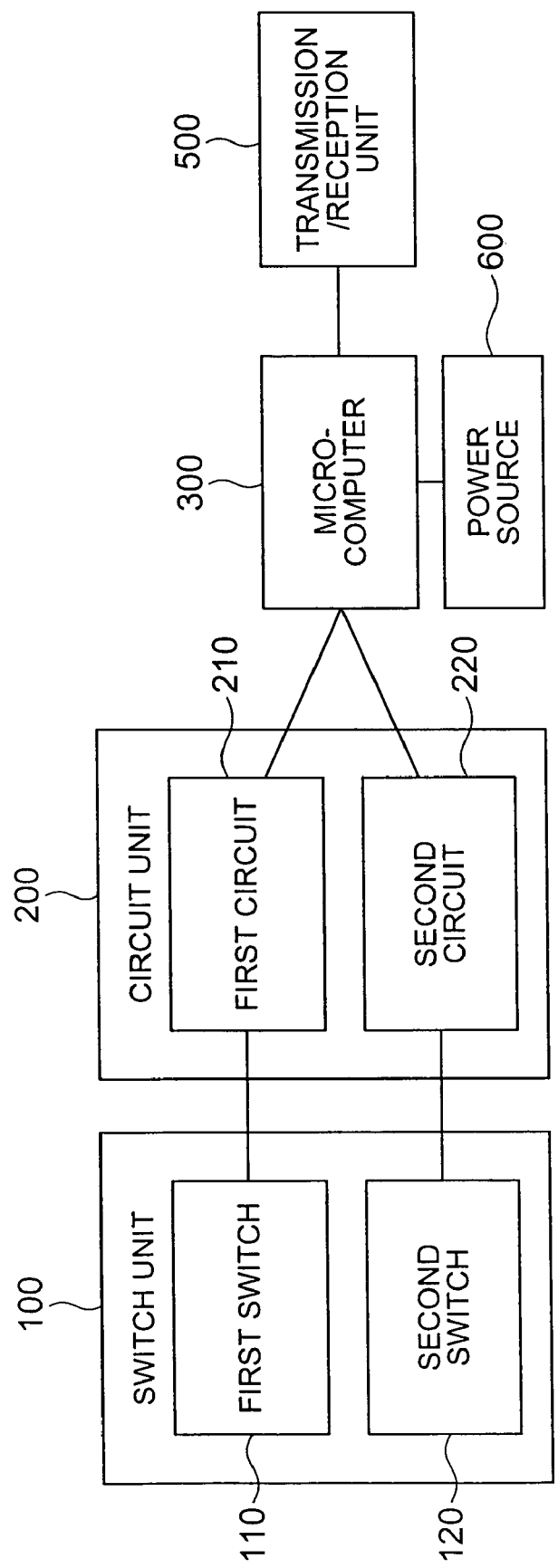
FIG. 2 is a function block diagram of a switch-equipped radio terminal device according to the present invention.

FIG. 2 is a function block diagram of the present invention. As shown in FIG. 2, the switch-equipped radio terminal device includes a switch unit 100, a circuit unit 200, a microcomputer 300, a power source 600, and a radio transmission/reception unit 700. Referring to FIG. 2, each of the functions of the present invention will be explained.

The switch unit consists of a first switch 110 and a second switch 120. The circuit unit consists of a first circuit 210 and a second circuit 220. The first switch is connected to the first circuit while the second switch is connected to the second circuit. The first circuit and the second circuit detect presence/absence of electrical connection by the first switch and the second switch, respectively and their outputs are connected to the microcomputer.

Figure 3:
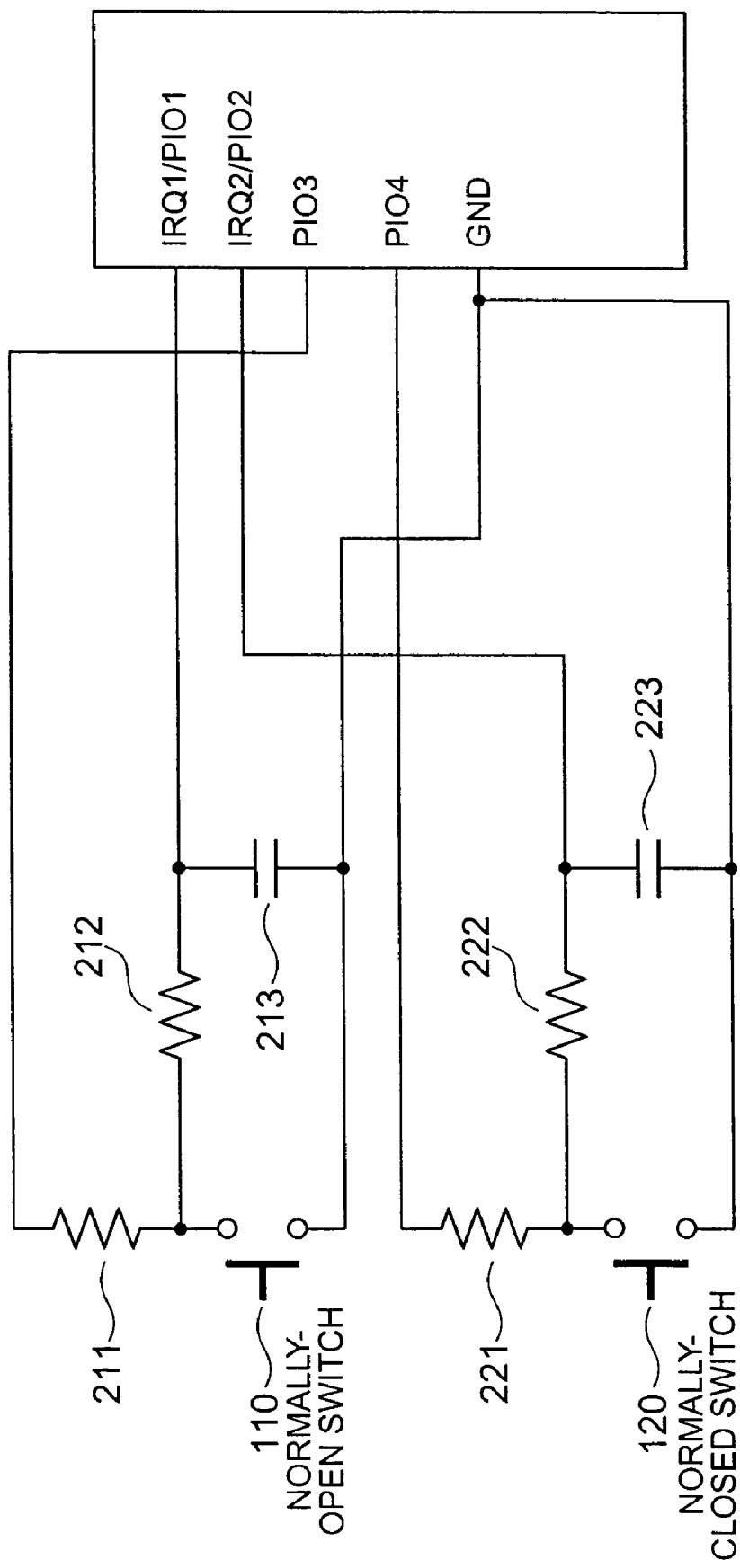
FIG. 3 is a circuit diagram of the circuit unit in the first embodiment of the present invention.
Figure 4:
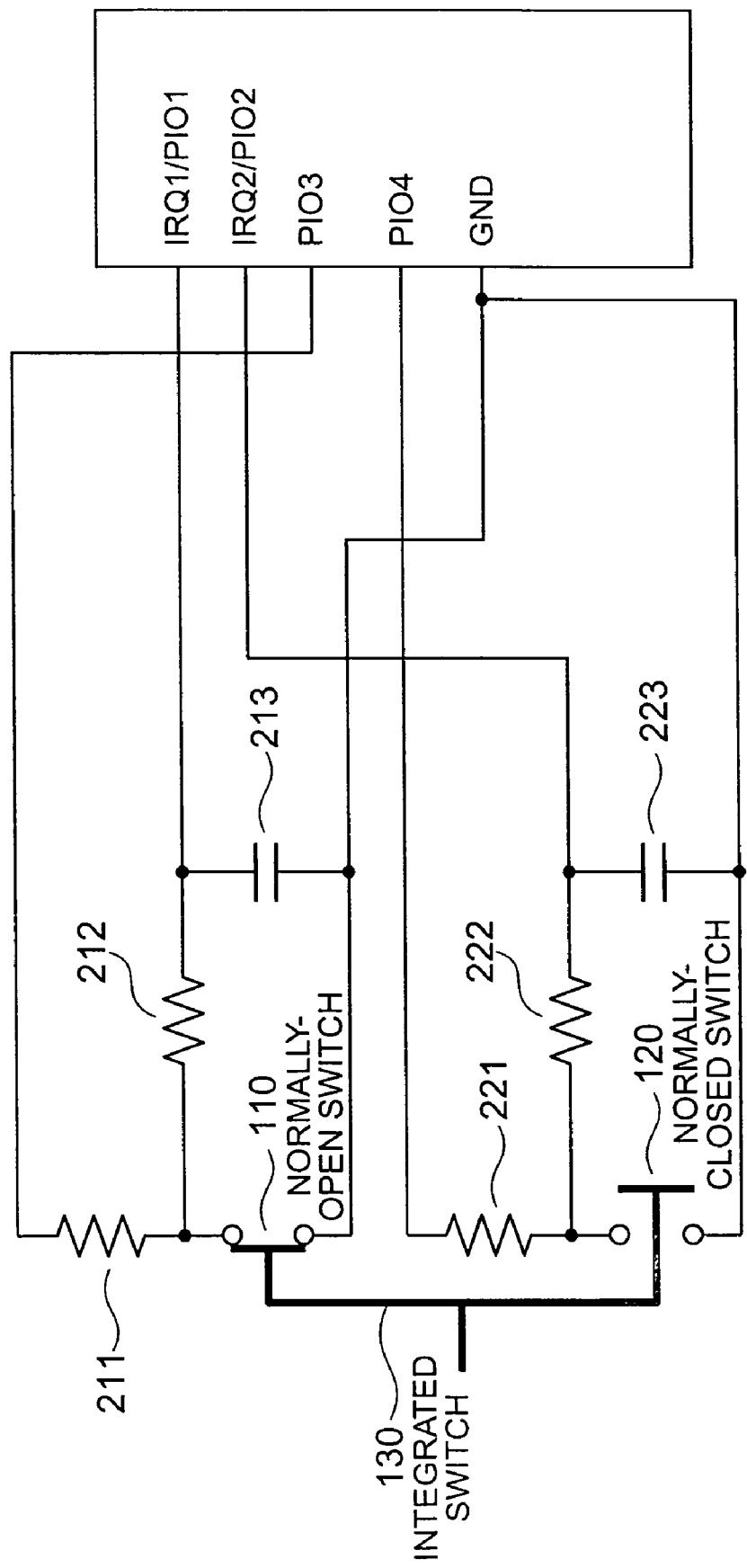
FIG. 4 is a circuit diagram of an integrated switch unit in the first embodiment of the present invention.

The contact operations of the first switch and the second switch of the switch unit are synchronized with opposite phases. When the first switch is in the contact state, the second switch is in the non-contact state. When the second switch is in the contact state, the first switch is in the non-contact state. As a structure, for example, the first switch is physically connected to the second switch (FIG. 4). Without the physical connection, the contact operations of the first switch and the second switch may be synchronized with the opposite phases by some means (FIG. 3). However, the operation is assured when the physical connection is present.

The circuit unit consists of a first circuit and a second circuit. When the first switch is in the contact state, the output voltage level of the first circuit becomes low. When the second switch is in the contact state, the output voltage level of the second circuit becomes low. It should be noted that the circuit unit includes elements such as a resistor and a capacitor.

The microcomputer controls the drive voltage supplied to the first circuit and the second circuit. Moreover, the microcomputer gives a transmission/reception instruction signal to the radio transmission/reception unit 500. The microcomputer has a built-in timer and various ports such as a power supply port, an interrupt port, an I/O port, and a ground port. The power supply port is connected to the power source. Normally, the power supply port is in the normally-cut-off state and activated by the operation instruction program when necessary. The interrupt port detects a voltage level change of the circuit unit connected to the interrupt port. By using the change as a trigger, the microcomputer can switch the voltage level of the I/O port. The I/O port is a port for receiving data from out of the microcomputer and outputting data outside of the microcomputer. The microcomputer may be in the wait mode or the active mode.

Figure 6:
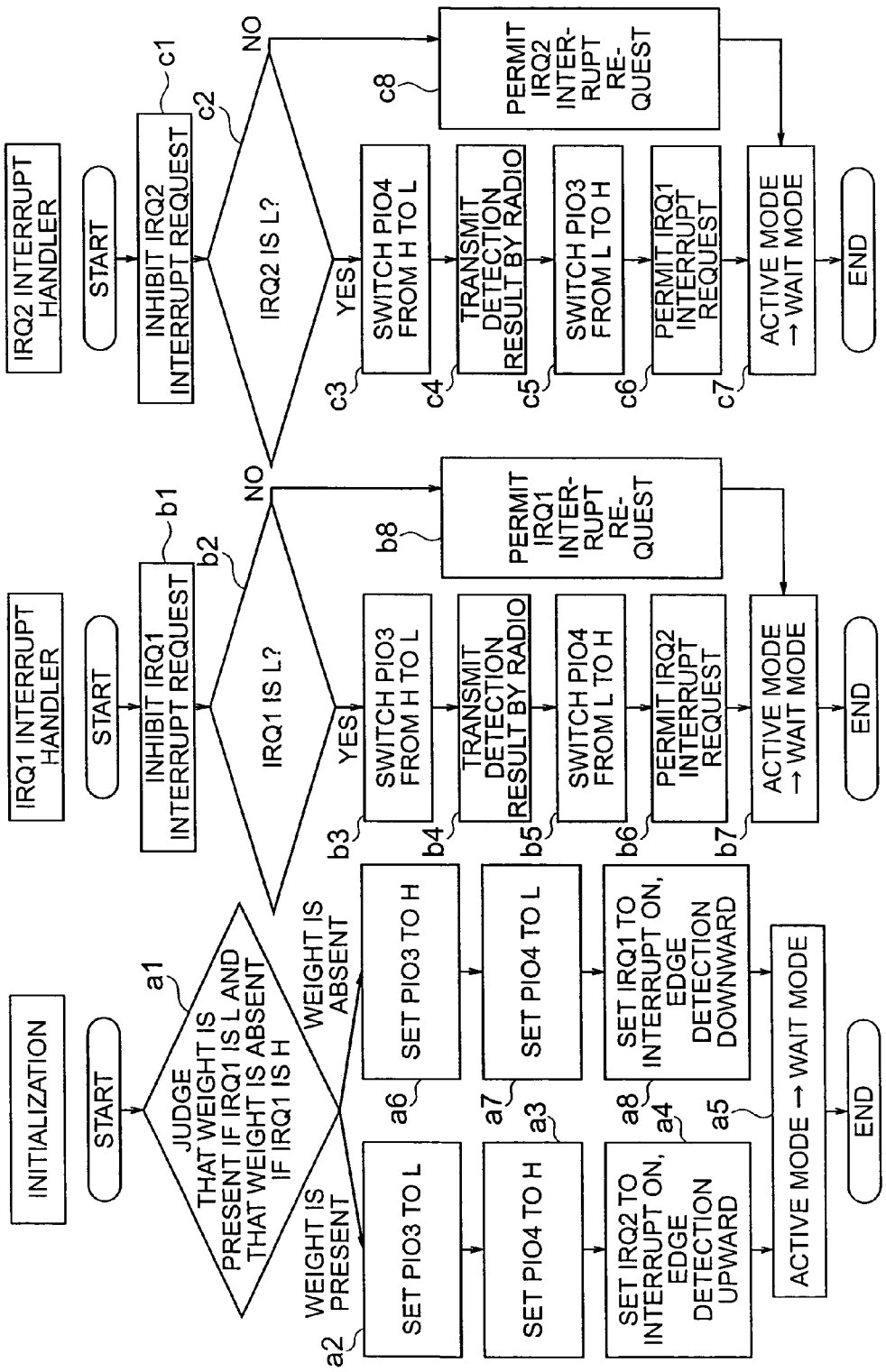
FIGS. 6A-6C are flowcharts of the microcomputer unit in the first embodiment of the present invention.

The active mode is a normal operation state. In the active mode, the microcomputer performs switch interface control, data management, control of radio transmission/reception, and control of the radio terminal device. Moreover, according to the instruction including an acknowledgement signal transmitted from the external radio terminal device, the microcomputer decides whether to continue the active mode for re-transmission or to switch to the wait state. Switching from the active mode to the wait mode is also performed by the handlers a5, b7, c7 in FIG. 6.

In the wait mode, power supply to the switch unit, the circuit unit, the radio transmission/reception unit, and to the respective blocks in the microcomputer is cut off and only the minimum leak current is consumed. However, in the wait mode also, it is possible to receive the interrupt from the interrupt port and the timer built in the microcomputer continues operation. Switching from the wait mode to the active mode is performed after an interrupt is received from the interrupt port or after the time specified by the built-in program has elapsed.

The power source supplies power to the respective units according to the instruction from the microcomputer.

Upon reception an instruction from the microcomputer, the radio transmission/reception unit performs radio transmission and reception. The radio function mounted on the radio chip in the radio transmission/reception unit is controlled by software mounted on the microcomputer, thereby performing communication. The radio chip is connected to the microcomputer by serial lines of two systems for data and control. Moreover, the radio transmission/reception unit transmits data to the microcomputer upon reception data from the external radio terminal.

FIG. 3 is a circuit diagram of the circuit unit in the first embodiment of the present invention. In the first embodiment, a normally-open switch is used for the first switch and a normally-closed switch is used for the second switch. The first circuit includes resistors 211, 212 and a capacitor 213 connected as configured in the figure and is connected to the first switch 110. The second circuit includes resistors 221, 222 and a capacitor 223 connected as configured in the figure and is connected to the second switch 120. The first circuit is connected to the microcomputer interrupt port simultaneously servicing as I/O port IRQ1/PIO1, the I/O port PIO3, and the ground GND. The interrupt port simultaneously serving as I/O port IRQ1/PIO1 is used as an input port for reading the output of the first circuit or an interrupt port for detecting the change of the output of the first circuit. The I/O port PIO3 is used as an output port for supplying drive voltage to the first circuit. When the normally-open switch is brought into contact while charge is accumulated in the capacitor 213 of the first circuit, current flows via the resistor 212→the normally-open switch 110 to the GND and the voltage level of the IRQ1/PIO1 becomes low.

The second circuit is connected to the microcomputer interrupt port simultaneously servicing as I/O port IRQ2/PIO2, the I/O port PIO4, and the ground GND. In the same way as the first circuit, the interrupt port simultaneously serving as I/O port IRQ2/PIO2 is used as an input port for reading the output of the second circuit or an interrupt port for detecting the change of the output of the second circuit. The I/O port PIO4 is used as an output port for supplying drive voltage to the second circuit. When the normally-closed switch is brought into contact while charge is accumulated in the capacitor 223 of the second circuit, current flows via the resistor 222→the normally-closed switch to the GND and the voltage level of the IRQ2/PIO2 becomes low.

The combination of the resistor 212 and the capacitor 213 and the combination of the resistor 222 and the capacitor 223 respectively remove the chattering by the switch. Moreover, it is preferable to build in a Schmidt Trigger for shaping the voltage waveform.

The normally-open switch 110 and the normally-closed switch 120 have opposite phases of the open/close operations and their operations are synchronized. That is, when the normally-open switch 110 is closed, the normally-closed switch 120 is open, and when the normally-open switch 110 is open, the normally-closed switch 120 is closed. FIG. 4 shows a case when the normally-open switch 110 is physically connected to the normally-closed switch 120 as means for synchronizing the operations of the normally-open switch 110 and the normally-closed switch 120.

Figure 5:
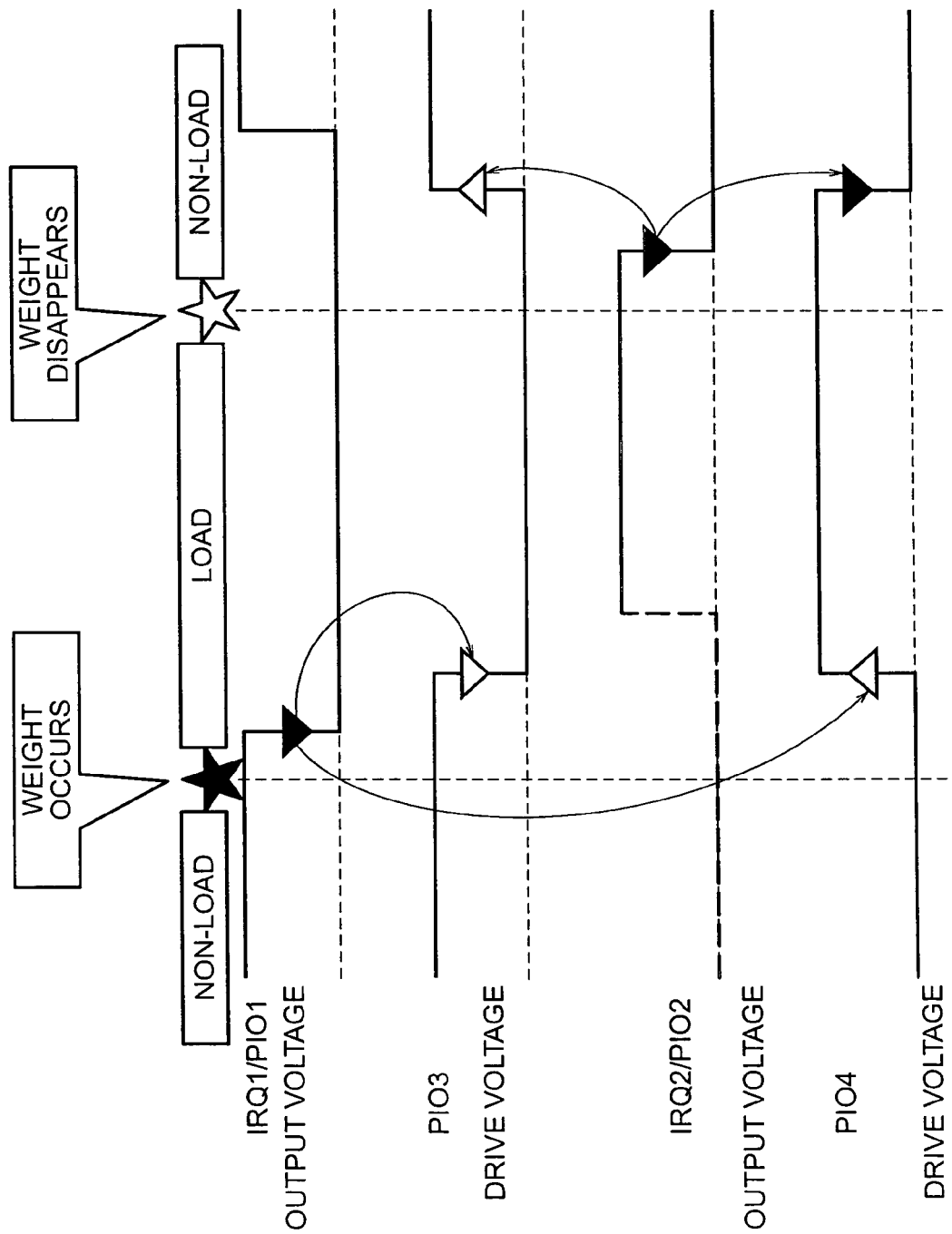
FIG. 5 is a timing chart of the first embodiment of the present invention.

Next, explanation will be given on the drive voltage control method in the first embodiment with reference to the timing chart in FIG. 5 and the flowchart in FIGS. 6A-6C.

As the initial setting, PIO3 is set to high for detecting the voltage level of IRQ1 (a1 in FIG. 6A). If the voltage level of IRQ1 is low, it is judged that the first switch is in contact and the voltage level of PIO3 is set to low (a2) while the voltage level of PIO4 is set to high (a3). After this, the interrupt request of IRQ2 is turned ON and the voltage edge detection is set to downward (a4). That is, the setting is such that the first circuit does not operate but the second circuit operates. Here, consumption of unnecessary current in the first circuit is suppressed. When the voltage level of IRQ1 is high, it is judged that the first switch is not in contact and the voltage level of PIO3 is set to high (a6) while the voltage level of PIO4 is set to low (a7). After this, the interrupt request of IRQ1 is set to high and the voltage level of PIO4 is set to low (a8). That is, the setting is such that the first circuit operates but the second circuit does not operate. Thus, consumption of unnecessary current in the second circuit is suppressed. After the aforementioned setting is complete, the microcomputer enters the wait mode (a5).

When a weight is applied to the switch unit, the normally-open switch is brought into contact and the normally-closed switch is brought into the non-contact state. When the normally-open switch is in the contact state, the output of the first circuit switches from high to low. That is, the voltage level of the IRQ1 turns from high to low. Triggered by this change, the microcomputer turned from the wait mode to the active mode and the IRQ1 interrupt handler in FIG. 6B is started.

In the IRQ1 interrupt handler, firstly, the IRQ1 interrupt request is inhibited (b1). Next, the voltage level of the IRQ1 is detected to confirm whether the voltage level of the IRQ1 is actually low (b2). Unless it is low, the IRQ1 interrupt request is permitted (b7) and the microcomputer turns from the active mode to the wait mode (b7). On the contrary, when the IRQ1 voltage level is actually low, the voltage level of PIO3 is switched to low (b3) and the detection result is transmitted by radio (b4). Moreover, PIO4 is switched from low to high so that the second circuit operates (b5) and the IRQ2 interrupt is permitted so that a change of the output of the second circuit can be detected (b6). After this, the microcomputer is switched from the active mode to the wait mode (b7).

Next, when the weight applied to the switch unit is released, the normally-closed switch is brought into the contact state and the normally-open switch is brought into the non-contact state. By the contact of the normally-closed switch, the output of the second circuit turns from high to low. That is, the voltage level of IRQ2 turns from high to low. Triggered by this change, the microcomputer is switched from the wait mode to the active mode and the IRQ2 handler in FIG. 6C is started.

In the IRQ2 interrupt handler, firstly, the IRQ2 interrupt request is inhibited (c1). Next, the voltage level of IRQ2 is detected to confirm whether the voltage level of IRQ2 is actually low (c2). Unless it is low, the IRQ2 interrupt request is permitted (c7) and the microcomputer again turns from the active mode to the wait mode (c6). On the contrary, when the voltage level of IRQ2 is actually low, the voltage level of PIO4 is switched to low (c3) and the detection result is transmitted by radio (c4). Moreover, PIO3 is switched from low to high so that the first circuit operates (c5) and the IRQ1 interrupt is permitted so that a change of the output of the first circuit can be detected (c6). After this, the microcomputer is switched from the active mode to the wait mode (c7).

Thus, when one switch (first switch) is brought into the contact state by generation/release of weight, this is detected by the low output voltage and the drive voltage of the circuit (first circuit) whose switch is brought into the contact state is set to low, thereby reducing the power consumption of the circuit. By setting the drive voltage of the second circuit to high in combination of setting the drive voltage of the first circuit to low, the second circuit is prepared for detection of that the second switch is brought into the contact state. Since the drive voltage of the second circuit is set to high when triggered by detection of the contact state of the first switch by the first circuit, the drive voltage is kept low while the second switch is in the contact state (first switch is in the non-contact state), thereby reducing the power consumption. Moreover, when the drive voltage of the second circuit is high, the second switch is in the non-contact state in synchronization with the contact of the first switch. Accordingly, even when the drive voltage of the second circuit becomes high, no current flows and no power is consumed. When the second switch is brought into the contact state, the same step as the case when the first switch is brought into contact is executed.

Figure 7:
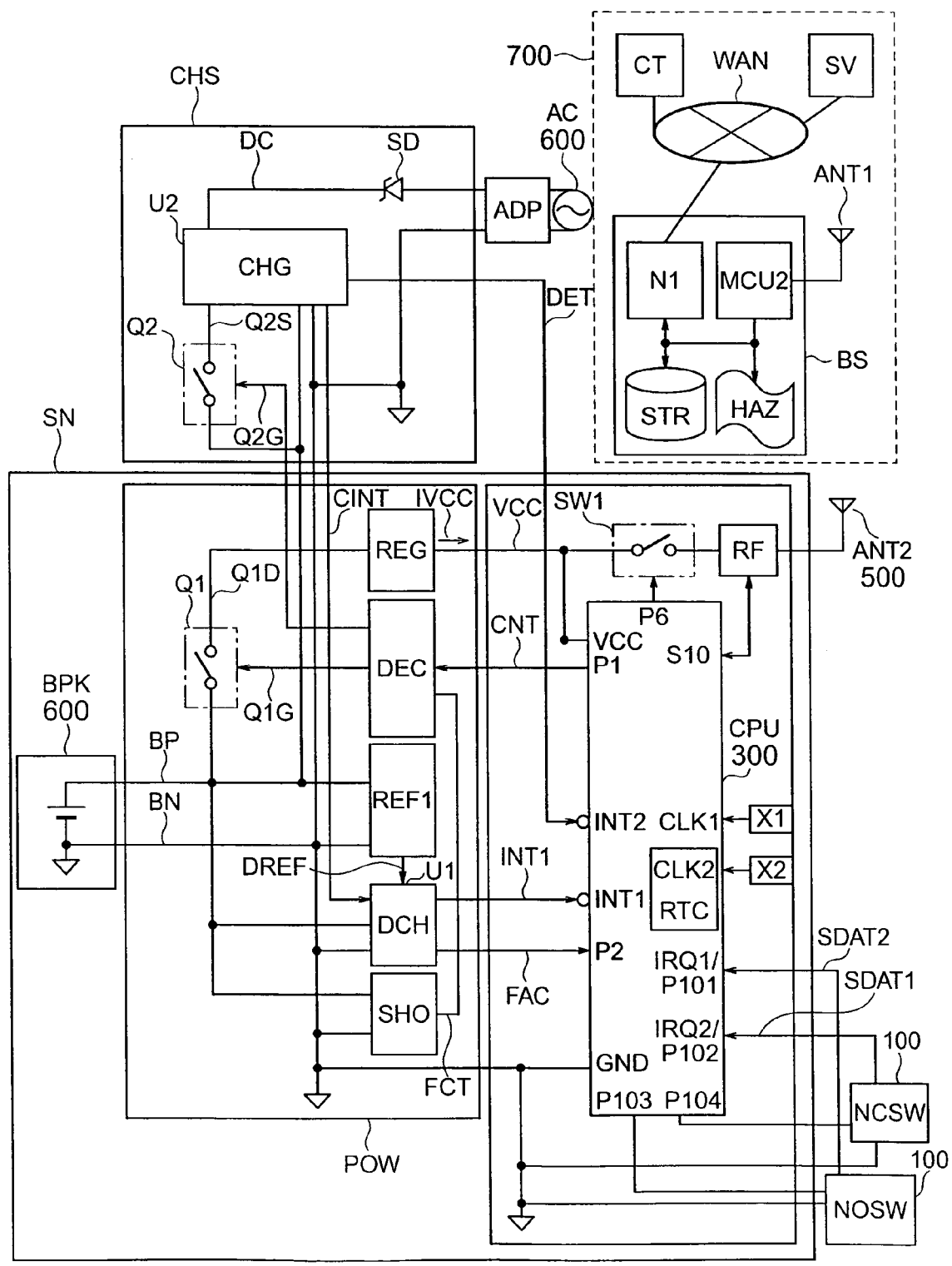
FIG. 7 is a block diagram showing configuration of the first embodiment.

FIG. 7 is a block diagram showing configuration of the first embodiment. Here, since a switch can be considered to be a sensor in a wide sense, the switch-equipped radio terminal device will be referred to as a sensor node. It should be noted that the sensor node may include various sensors such as a temperature sensor and a weight sensor.

The system of FIG. 7 includes a sensor node SN, a charger CHS, an AC adapter ADP, a radio base station BS, a communication network WAN, a server SV, and a management center CT. Data SDAT1 and SDAT2 sensed by the sensor node SN are notified by radio communication to the radio base station BS, displayed on a display HAZ, and stored in a storage STR. The data is stored in the server SV by the network interface circuit NI via the communication network WAN. Moreover, there is a management center CT connected to the communication network WAN for performing concentrated management of the sensor node SN. Furthermore, when the secondary battery BPK mounted on the sensor node SN requires charging, the AC adapter ADP and the charger CHS are connected to the sensor node SN for charging.

The sensor node SN includes the secondary battery BPK, a charge/discharge control circuit POW, a microcomputer control circuit MCU1, a normally-open switch NOSW, a normally-closed switch NCSW, and an antenna ANT1. The data SDAT1 and SDAT2 detected by the normally-open switch NOSW and the normally-closed switch NCSW are processed in the microcomputer control circuit MCU1, reported to the radio base station BS via the radio circuit RF and the antenna ANT1, displayed on the display HAZ, and stored in the storage STR. The normally-closed switch NCSW and the normally-open switch NOSW operate in synchronization with each other. When their open/close state is changed, the CPU detects a change of the voltage level of the normally-closed switch NCSW and the normally-open switch NOSW. Triggered by this interrupt, the sensor node SN transmits the ID of the sensor node SN, the switch ON/OFF information, and the frame length of data to be transmitted, to the radio base station BS.

Here, the power supply switch SW of the radio circuit RF is electrically connected only when performing radio communication and minimizes the power consumption when the circuit is not operating. Similarly, the main clock X1 of the microcomputer control circuit MCU1 is operated only when detection operation, radio communication operation, or charge/discharge control operation is required in the microcomputer control circuit. When no operation is required, only the sub clock X2 is operated for supply to the timer RTC counting the intermittent start time. thus, the power consumption during the wait state is minimized. It should be noted that in this embodiment, the timer RTC built in the microcomputer is used for counting the intermittent start time but it is also possible to use an external timer.

The charge/discharge control circuit POW includes a discharge stop switch Q1, a regulator REG, a voltage monitor/interrupt circuit DCH, a discharge stop reference potential generation circuit REF1, a switch control circuit DEC, and an over-current detection circuit SHO. Here, the discharge stop voltage DREF is generated by the discharge stop reference potential generation circuit REF1 and the voltage is compared to the voltage BP of the secondary battery BPK by the voltage monitor/interrupt circuit DCH. When the voltage BP of the secondary battery BPK is not greater than the discharge stop voltage DREF, an interrupt signal INT1 and an interrupt factor signal FAC are outputted. Moreover, when the charge stop voltage detection signal CINT from the charger CHS is set, the interrupt signal INT1 and the interrupt factor signal FAC are generated and outputted by the voltage monitor/interrupt circuit DCH.

Upon reception of the interrupt signal INT1, the microcomputer CPU causes the system clock X1 operate so that the microcomputer CPU is switched to the operation-enabled state, outputs the switch control signal CNT according to the interrupt factor signal FAC, and simultaneously with this, reports the battery state via the radio circuit RF and the antenna ANT1 to the base station BS. Here, if the battery state received at the radio base station is the discharge stop, a user connects the charger CHS and the AC adapter ADP to the sensor node. On the other hand, the switch control circuit DEC which has received the switch control signal CNT outputs a control signal Q2G of a charge stop switch Q2. In the case of charge stop, the charge stop switch Q2 is cut off and in the case of charge stop reset, the charge stop switch Q2 is electrically connected. Similarly, a control signal Q1G of a discharge stop switch Q1 is outputted. In the case of discharge stop, the discharge stop switch Q1 is cut off and in the case of the discharge stop reset, the discharge stop switch Q1 is electrically connected. Moreover, when an over-current is caused in the circuit connected to the secondary battery BPK, the over-current is detected by the over-current detection circuit SHO and the over-current detection signal FCT is outputted so as to cut off the discharge stop switch Q1 via the switch control circuit DEC.

Figure 8:
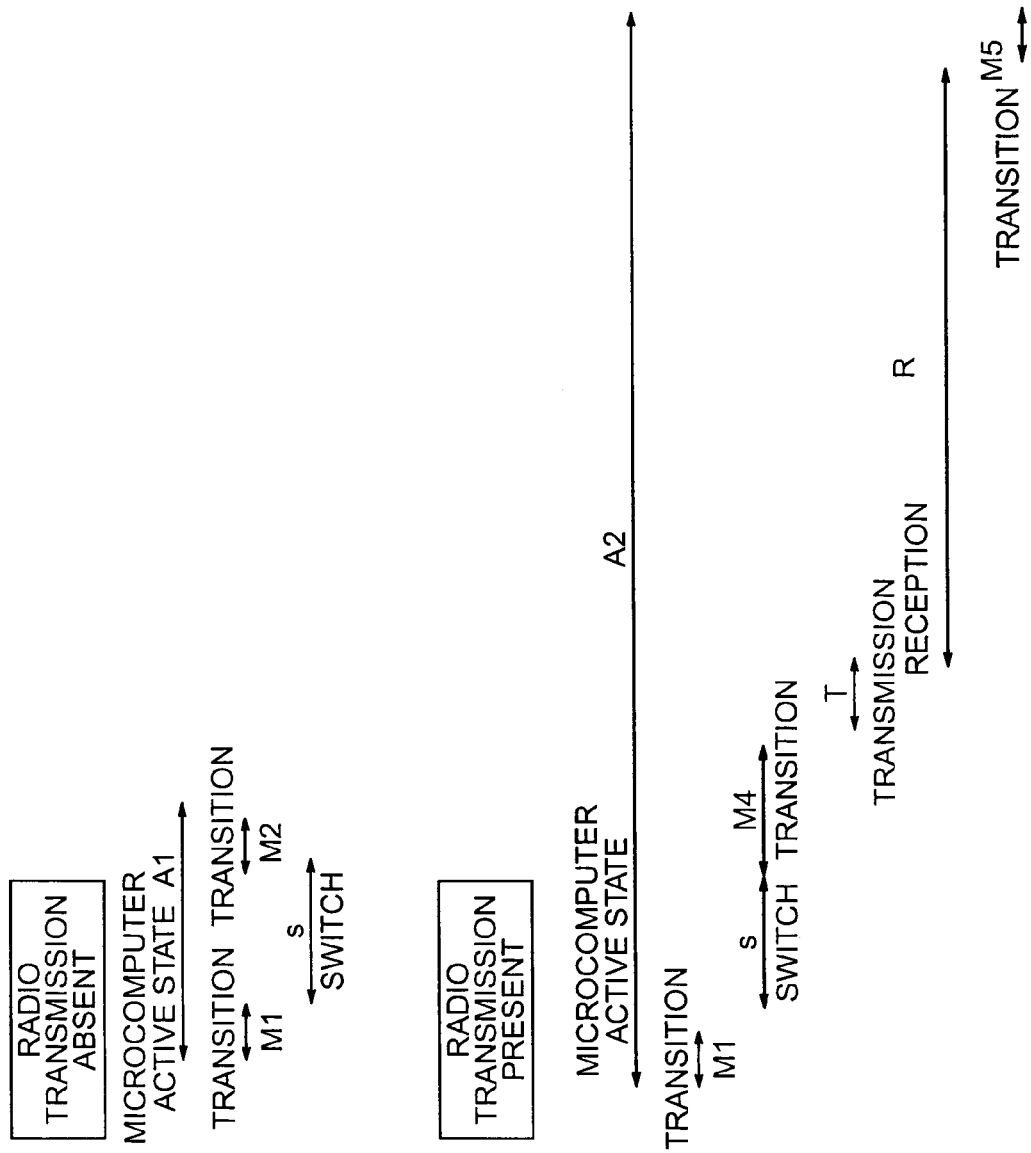
FIG. 8 shows an example of operation and operation time duration during intermittent operation.
Figure 9:
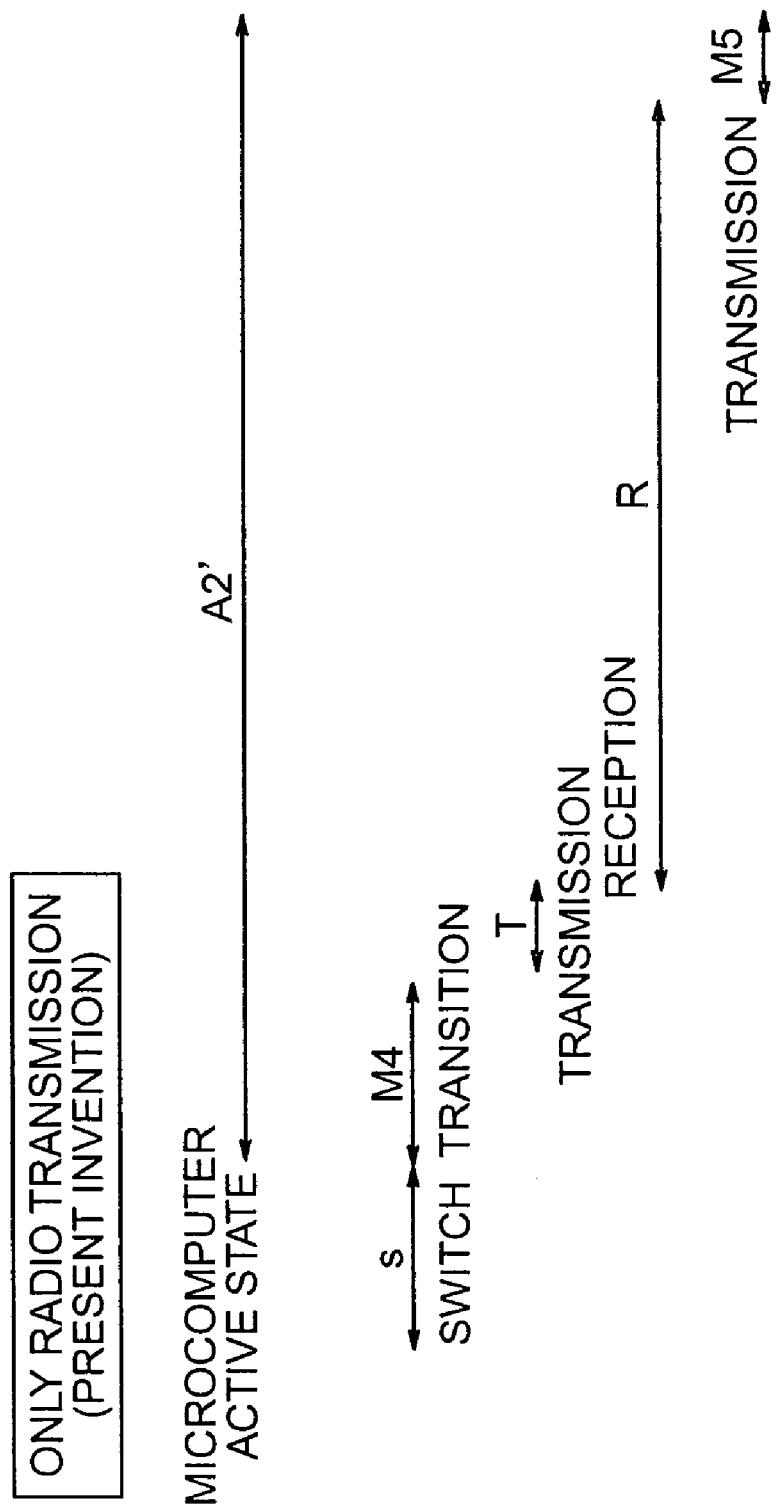
FIG. 9 shows an example of operation and operation time duration in the first embodiment of the present invention.

Next, the effect of reduction of power consumption in the first embodiment is obtained to show that the present invention is sufficiently effective as a low power consumption method. FIG. 8 shows a model indicating an operation time of each component for evaluating the power consumption in the conventional intermittent operation method: a case having a radio transmission and a case having no radio transmission. Moreover, FIG. 9 is a model indicating an operation time of each component for evaluating the power consumption in the present invention (event-driven operation).

FIG. 8 will be explained. In the initial state, the microcomputer is in the wait mode of the low power consumption state. When the intermittent operation interval has elapsed by the timer interrupt, the microcomputer is switched to the active mode. After the switching, it is assumed that time M1 is required until current starts to flow into the switch unit and the circuit unit. After that, it is assumed that current flows into the switch unit and the circuit unit for time S. Here, if no change of contact/non-contact is detected, it is assumed that no radio transmission or reception is executed to save the power consumption and the microcomputer is switched again to the wait mode after time M2.

When a change of contact/non-contact is detected, a radio transmission is performed for time T after elapse of time M4 after the current has flown into the switch unit and the circuit unit for time S. After that, the reception mode set for time R so as to receive the acknowledge signal. After elapse of time M5, the microcomputer is switched to the wait mode.

Next, explanation will be given on FIG. 10. The following parameters have been set temporarily so as to calculate power consumption.

Switch unit, circuit unit:

Circuit resistance: 10 kΩ

Drive voltage: 3V

Drive time S at once: 100 ms

Accordingly, power consumed by the switch at one operation: 0.09 mJ

Power consumption of the microcomputer (active mode)

Current consumed: 5 mA

Drive voltage: 3V

Drive time at once: when no transmission A1=180 ms, when radio transmission is performed A2=800 ms Accordingly, the power consumed by the microcomputer (active mode) at one operation: 12 mJ, 2, 7 mJ Power consumed by microcomputer (wait mode):

Current consumed: 10 μA

Drive voltage: 3V

Drive time at once: –

Accordingly, power consumed by the microcomputer (wait mode) at one-second operation: 30 μW Power consumed during radio transmission Power consumption for one second: 50 mW Transmission time at once: 20 ms Power consumption at once: 1 mJ Power consumed when radio reception is performed:

Power consumption for 1 second: 80 mW

Transmission time at once: 500 ms

Power consumption at once: 40 mJ

Here, the scenario is assumed to be such that "the switch contact/non-contact is switched over only once at a moment during 30 minutes and the switching is to be detected". In this scenario, the power consumption and detection delay are compared between the intermittent operation method and the present invention.

Since the present invention detects the contact/non-contact change by the event drive, the total operation time is once in the assumed scenario.

In the detection by the intermittent operation, when a switching of contact/non-contact occurs until each intermittent operation, the switching is detected. Even when the switching of switch contact/non-contact state is actually not performed, the contact/non-contact detection operation is performed at each intermittent operation, consuming the power. The intermittent operation interval is set to 1 second, 10 seconds, 1 minute, 15 minutes, and 30 minutes and each of these is evaluated.

In the intermittent operation detection, if once in 30 minutes, the total number of operations is once, if once in 15 minutes, then twice, if once in one minute, then 30 times, if once in 10 seconds, then 180 times, and if once in one second, then 1800 times.

The radio transmission/reception is performed after the switching of contact/non-contact is actually detected and accordingly, once in any of the cases.

Moreover, the operation time is as follows. The unit is mili-second.

$A1=180$, $M1=40$, $S=100$, $M2=40$, $A2=800$, $M4=100$, $T=20$, $R=500$, and $M5=40$.

From the aforementioned, the power consumption during the intermittent operation is as follows:

Switch: 0.09 mJ×number of operation times,

Microcomputer (active mode): during transmission 12 mJ, when no transmission is performed 2.7 mJ×number of operation times.

Radio transmission: 1 mJ,

Radio reception: 40 mJ,

Microcomputer (wait mode): wait time×0.06 [mJ],

Accordingly, if once in 30 minutes, then 107.0606 mJ; if once in 15 minutes, then 109.8452 mJ; if once in 0.1 minute, then 187.814 mJ; if once in 10 seconds, then 605.504 mJ; if once in one second, then 5116.556 mJ. This is shown in the graph of FIG. 10. It should be noted that FIG. 11 is graph showing the operation interval in log scale.

Next, the power consumption in the aforementioned scenario by using the first embodiment is calculated. Basically, this is identical to the operation for detecting once in 30 minutes in the intermittent operation method. However, in this invention, the microcomputer is switched from the wait mode to the active mode when triggered by the switching of the contact/non-contact state of the first or the second switch and accordingly, $A2'=A2-M1-S$.

As a result, in this invention, it is possible to perform detection by 104.970 mJ. This power consumption is smaller than that required in the intermittent operation method based on once in 30 minutes. Moreover, in the intermittent operation based on once in 30 minutes, 30 minutes of delay is caused at maximum while the delay in this invention is 660 ms.

Moreover, when the intermittent operation method is used, if the intermittent operation interval is reduced so as to suppress the delay, the total of power consumption is greatly increased as compared to the present invention as is shown in the double-logarithmic graph. In the comparison of the power consumption in the intermittent operation method with that of the present invention (FIG. 11), as the total power consumption and the operation interval are reduced, the required specification is satisfied. The present invention shows a value positioned at the cross point which shows the operation interval and the power consumption smaller by about one digit than in the intermittent operation method.

The reduction ratio of power consumption obtained by using the present invention as compared to the intermittent operation method is: 1.31, 3.81. 43.7. 82.6, 97.9 [%] when the intermittent operation interval is once in 30 minutes, once in 15 minutes, once in 1 minute, once in 10 seconds, and once in one second. Thus, especially as compared to the intermittent operation method based on a plenty number of operation numbers in 30 minutes, the present invention can reduce the power consumption greatly. When the present invention is compared to the intermittent operation based on 1800 times of operations in 30 minutes (one operation in 1 second), it is possible to achieve 97.9% of reduction of power consumption.

As has been described above, the present invention has excellent characteristic in both of the power consumption and the prompt detection as compared to the intermittent operation method. Accordingly, this invention can be said to be an effective method as a low power consumption type of the radio small-size terminal device.

It should be noted that the first embodiment has been explained with a switch as a detector but the present invention can also be applied to a sensor whose electric connection is changed by detection/non-detection. For example, the invention can be applied to a case having two thermostats, one of which has a conductor section brought into contact in a certain temperature range and the other of which has a conductor section brought into non-contact in the temperature range.

Embodiment 2

In the second embodiment, in addition to the event-driven type operation in which the microcomputer is operated according to the detection of presence/absence of contact or weight by a switch unit, an intermittent operation is performed by the microcomputer. When only the event-driven type is used and detection fails once, there is a danger that an erroneous state is detected for a long period of time. For this, in addition to the even-driven type operation, the microcomputer intermittently applies a drive voltage to the first circuit and the second circuit, thereby compensating the failure of detection by the event-driven type operation.

Figure 10:
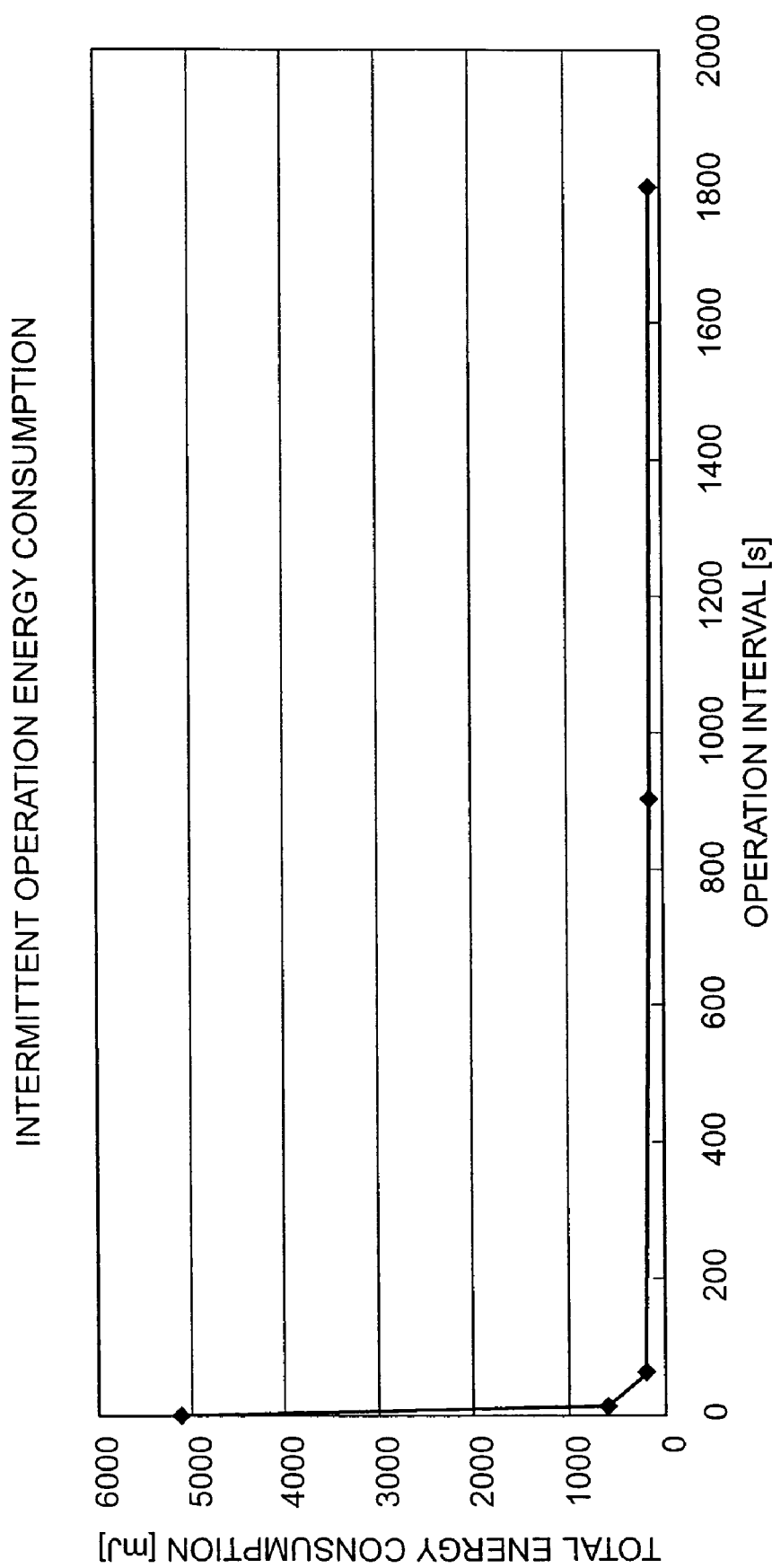
FIG. 10 shows power consumption in intermittent operations in the first embodiment of the present invention.
Figure 11:
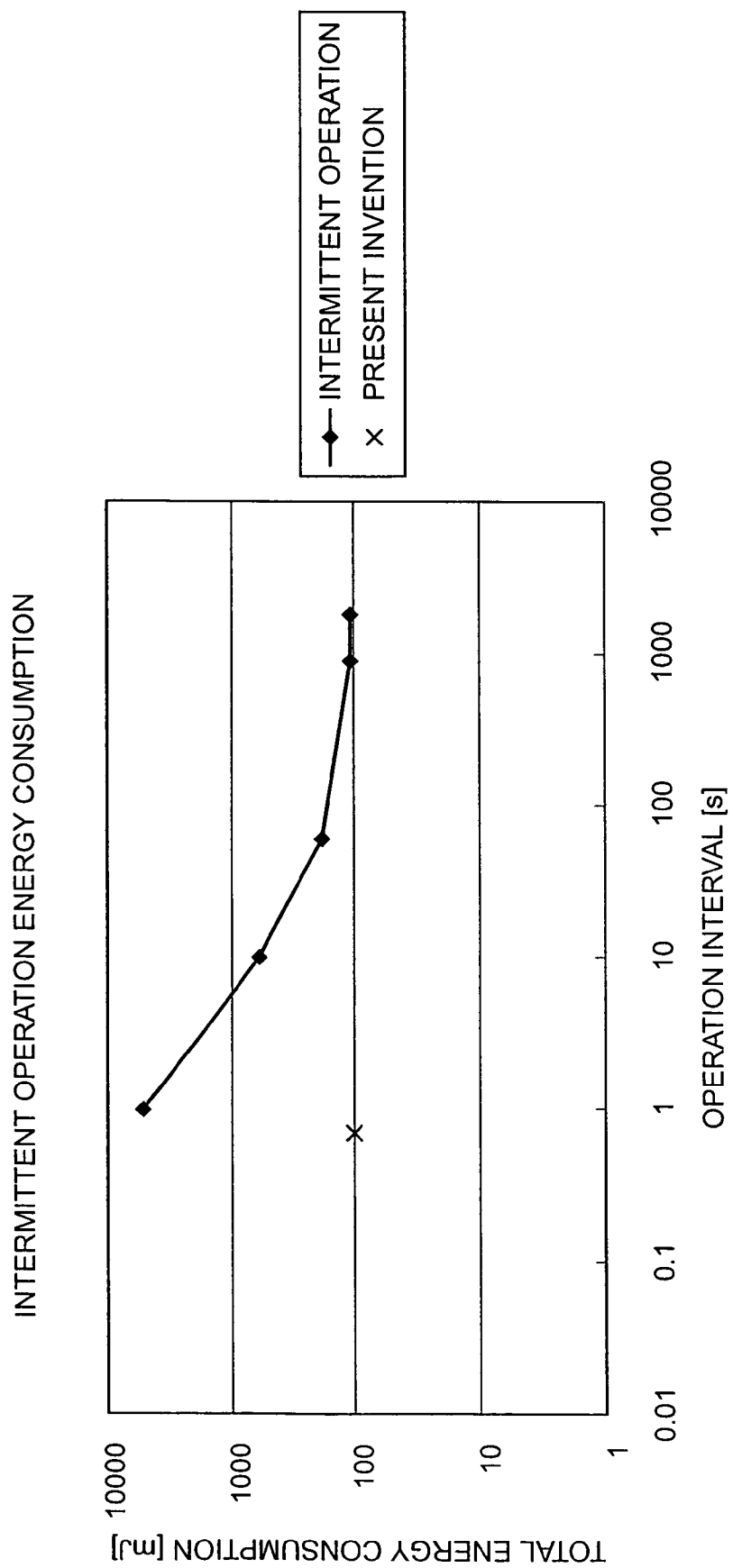
FIG. 11 is a both-logarithmic graph of FIG. 10.

In the model shown in FIG. 10 and FIG. 11, when the microcomputer operation and the switch ON/OFF detection are made intermittent operation instead of the event-driven type operation, the power consumption of the intermittent operation is not greatly changed as compared to the event-driven type if the intermittent operation interval 1000 seconds or above. Accordingly, when it is assumed that the switch ON/OFF is changed once in about 30 minutes, by switching the microcomputer from the wait state to the active state once in about 1000 seconds so as to detect the switch ON/OFF state, it is possible to reduce the detection delay from 1800 seconds at maximum to 1000 seconds at maximum without significantly increasing the power consumption.

Embodiment 3

Figure 12:
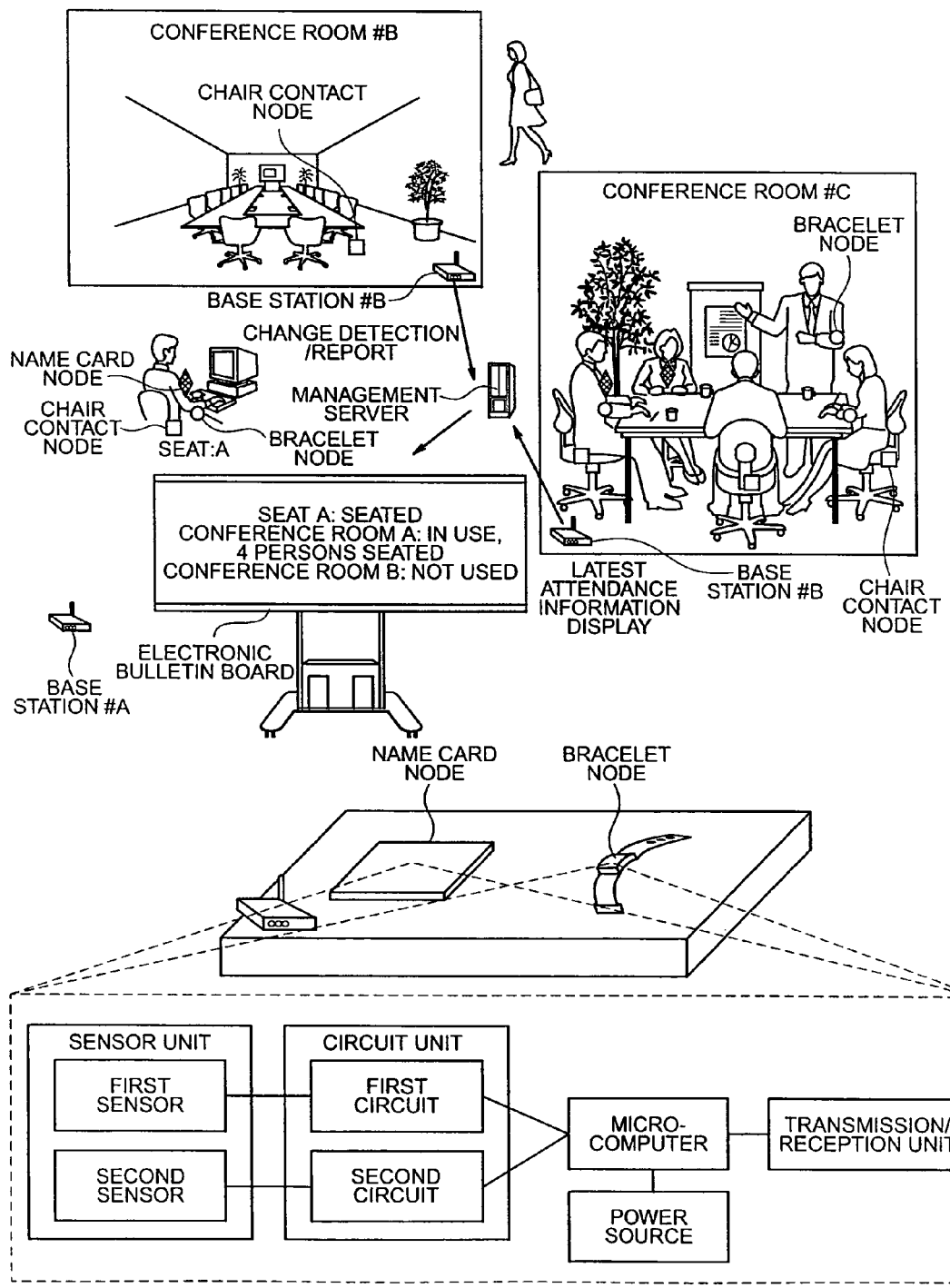
FIG. 12 shows an example 1 to which the present invention is applied.

FIG. 12 shows a first application example of the present invention. The sensor unit of the sensor-equipped radio terminal according to the present invention is arranged on a chair. The sensor-equipped radio terminal device arranged on the chair is called a chair contact node. The chair can detect when a person is seated on the chair and when the person leaves the chair. When seating or leaving is detected, the chair contact node transmits the seating/leaving information by radio to a base station.

The base station receives seating/leaving information from a plurality of chair contact nodes. Moreover, the base station transmits an acknowledgement signal to the chair contact node in order to report that the data from the chair contact node has been correctly received. In a conference room or the like, one base station is arranged. In a large room, base stations are arranged at an appropriate interval. The base station transfers the seating/leaving information on each chair by cable or radio to a management server.

The management server manages the data on the base station and the chair contact nodes in batch. The electronic bulletin board displays the seated/non-seated information on each chair and the use condition of the conference room. The seated/non-seated information may display whether a person is seated. The seated/non-seated information and the conference room use condition are detected by the chair contact nodes arranged on the chairs. When a change is caused in the detection by the chair contact nodes, the result is reflected on the electronic bulletin board.

In the space of this example, the seated/non-seated information on a person in the space and the use condition of the conference room are displayed on the electronic bulletin board in real time and the information can be shared by various person. For example, if Mr./Ms. X knows that Mr./Ms. A is seated in this seat "a", Mr./Ms. X can makes direct contact with Mr./Ms. A by a telephone or a mail. Moreover, if Mr./Ms. X knows that Mr./Ms. B has left his seat "b", Mr./Ms. X can call the mobile phone of Mr./Ms. B. Thus, it is possible to use appropriate contact means without performing useless operations.

As another example, when an urgent conference should be held, it is possible to obtain information on an empty conference room on the electronic bulletin board and it is also possible to grasp how many persons have been seated already. The lower half of FIG. 12 shows name card node to which the present invention is applied. The name card node is a thin mobile sensor node having various sensors and the radio function. The name card node transmits various sensing data to the base station by radio.

When the present invention is applied to the name card node which is designed as follows. When the name card node is placed on the surface of a desk or the like, the switch is turned on by the weight of the name card node itself and the switch is turned off when the name card node leaves the desk.

By this application, for example, when the name card node performs an intermittent operation and is placed on the desk, the switch is turned on and the power supply of the name card node is automatically cut off. Moreover, when the name card node leaves the desk, the switch is turned off and the power supply of the name card node is automatically started.

Thus, when the name card node is not used, the power supply is automatically turned off, thereby saving the power consumption. Moreover, since the power ON/OFF time of the name card node is transmitted to the base station and the management server by radio, it is possible to manage the use time of the name card node.

As shown in the upper half of FIG. 12, it is also possible to use the combination of the seated/non-seated detection and the name card node. A unique ID is assigned to each of the name card node and the chair detection node set on the chair. When the name card node and the chair detection node transmit data by radio to the base station, they also transmit their ID's. When the name card node and the chair detection node of the same owner are correlated, for example, if the chair detection node of Mr./Ms. A in the area of base station "a" is ON and the name card node of Mr./Ms. A is detected in the area of the base station "b" out of the area "a", it is possible to consider that a person other than Mr./Ms. A is seated on the chair of Mr./Ms. A.

A bracelet node to which present invention is applied is shown in the lower half of FIG. 12. The bracelet node is a thin mobile sensor having various sensors and the radio function. The bracelet node transmits various sensing data to the base station by radio.

The present invention is applied to this bracelet node, which is designed so that when the bracelet node is placed on a flat surface such as a desk, the switch is turned ON by the weight of the bracelet itself, and when it leaves the desk, the switch is turned OFF.

By this application, for example, when the bracelet node is performing an intermittent operation and placed on the desk, the switch is turned on to automatically disconnect the power supply of the bracelet node. Moreover, when the bracelet leaves the desk, the switch is turned off to automatically start the power supply of the bracelet node.

By this application, it is possible to automatically turn off power supply of the bracelet node when it is not in use, thereby saving the power consumption. Moreover, the on/off switching time of the power supply of the bracelet node is transmitted to the base station and the management server by radio and it is possible to perform the use time of the bracelet node.

It is possible to use the seated/non-seated detection in the upper half of FIG. 12 in combination with the bracelet node. A unique ID is assigned to each of the bracelet node and the chair detection node set on the chair. When the bracelet node and the chair detection node transmit data to the base station by radio, they also transmit their ID's. When the ID of the bracelet node and the ID of the chair detection node of the same owner are correlated, for example, if the chair detection node of Mr./Ms. A in the area of the base station "a" is on and the bracelet node of Mr./Ms. A is detected in the area of base station "b" out of the area of the base station "a", it is possible to consider that a person other than Mr./Ms. A is seated on the chair of Mr./Ms. A.

Embodiment 4

Figure 13:
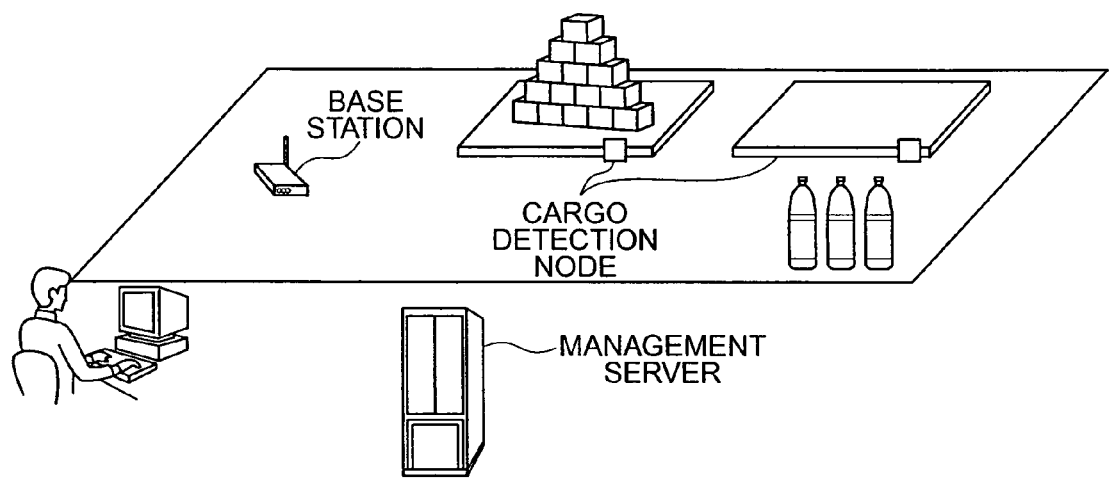
FIG. 13 shows an example 2 to which the present invention is applied.

FIG. 13 shows a second application example of the present invention. The present invention can be applied to detection of presence/absence or taking away of cargo and a device.

Embodiment 5

Figure 14:
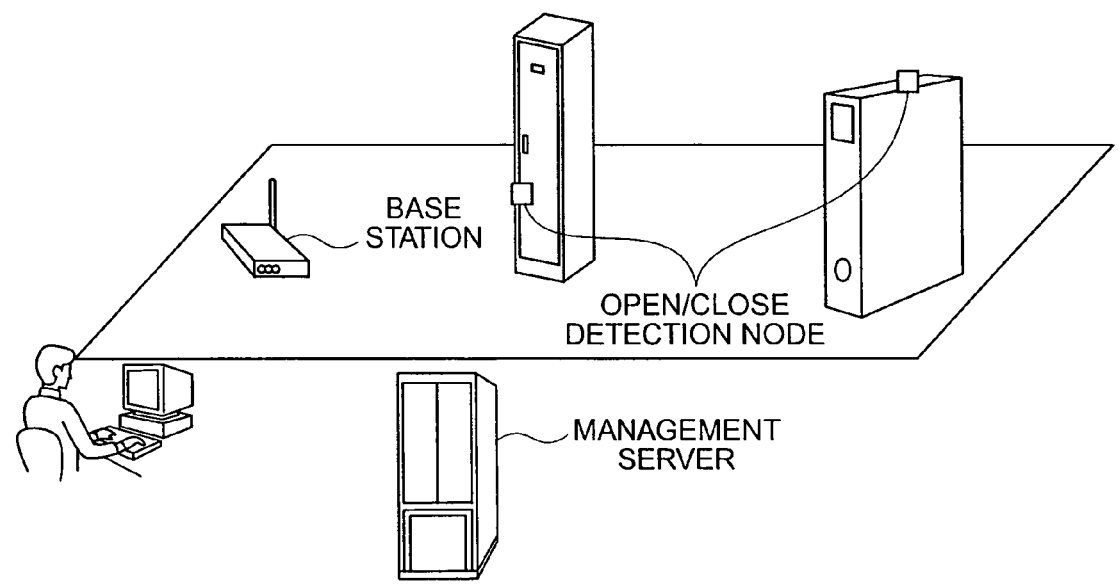
FIG. 14 shows an example 3 to which the present invention is applied.

FIG. 14 shows a third application example of the present invention. The present invention can be applied to detection of opening/closing of a door, a drawer, a locker, a file, and the like.

The present invention can be applied to the following: presentation service such as detection of a seated person and a use condition of a conference room; item management by using detection of presence/absence of cargo and a device; and a facility management utilizing detection of opening/closing of various doors and drawers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sensor device comprising:
   a sensor unit for detecting a detection object;
   a processor unit for controlling supply of drive voltage to the sensor unit and detecting a change of the output voltage from the sensor unit; and
   a power source for supplying power to the processor unit,
   the sensor unit having at least a first sensor and a second sensor operating in such a way that the first sensor makes-electrical connection when the detection is in the ON state and cuts off current when the detection is in the off state, while the second sensor makes electrical connection when the detection is in the off state and cuts off current when the detection is in the on state, wherein, the detection on/off conditions of the first sensor and the second sensor are opposite and the detection operations are synchronized;
   wherein
   when the first sensor detects a detection object, the first sensor changes its output voltage level, and
   when the processor unit detects the change of the output voltage level of the first sensor as an interrupt signal, the drive voltage level of the first sensor is switched from the first signal level to the second signal level which is different from the first signal level and the drive voltage level of the second sensor is switched from the second signal level to the first signal level which is different from the second signal level, and
   moreover, when the second sensor detects a detection object, the second sensor changes its output voltage level, and
   when the processor unit detects the change of the output voltage level of the second sensor as an interrupt signal, the drive voltage level of the second sensor is switched from the first signal level to the second signal level which is different from the first signal level and the drive voltage level of the first sensor is switched from the second signal level to the first signal level which is different from the second signal level.

2. A sensor device as claimed in claim 1, wherein the sensor unit is a switch unit for detecting presence/absence of a contact or a weight, the first and the second sensor are the first and the second circuit respectively including the first and the second switch, the open/close operations of the first switch and the second switch being opposite and their open/close operations being synchronized,
   when the first switch detects presence/absence of a contact or a weight, the output voltage level of the first circuit is changed, and
   when the second switch detects presence/absence of a contact or a weight, the output voltage level of the second circuit is changed.

3. A sensor device as claimed in claim 1, wherein the processor unit is switched from the wait mode to the active mode by the change of the output voltage level from the sensor unit, controls the drive voltage level of the first or the second sensor, and again switched to the wait mode according to the change of the output voltage level from the sensor unit.

4. A sensor device as claimed in claim 1, wherein the processor unit has a built-in timer and intermittently applies a drive voltage to the first or the second circuit to detect sensor information according to the time acquired by the timer, separately from the detection based on the interrupt signal from the sensor unit.

5. A sensor device as claimed in claim 4, wherein the sensor unit further comprises a radio unit for transmitting information on the detection result by radio, the processor unit has a built-in memory for recording the detection state of a detection object, and
   when the sensor unit detects a detection object, the radio unit does not perform radio transmission if the processor unit judges that the detection content is not changed as compared to the previous detection recorded in the memory and the radio unit performs radio transmission if the processor unit judges that the detection content is changed as compared to the previous detection.

6. A sensor device as claimed in claim 3, the sensor device further comprising a radio unit for transmitting the information on the detection result by radio.

7. A sensor device as claimed in claim 1, wherein the first signal level and the second signal level of the drive voltage level of the first sensor and the second sensor, are high and low, respectively.

8. A sensor drive method in a sensor device comprising:
   a sensor unit for detecting a detection object;
   a processor unit for controlling supply of drive voltage to the sensor unit and detecting a change of the output voltage from the sensor unit; and
   a power source for supplying power to the processor unit,
   wherein the sensor unit has at least a first sensor and a second sensor operating in such a way that the first sensor makes electrical connection when the detection is in the ON state and cuts off current when the detection is in the off state, while the second sensor makes electrical connection when the detection is in the off state and cuts off current when the detection is in the on state, wherein, the detection on/off conditions of the first sensor and the second sensor are opposite and the detection operations are synchronized;
   when the first sensor detects a detection object, the first sensor changes its output voltage level, and
   when the second sensor detects a detection object, the second sensor changes its output voltage level,
   wherein when the processor unit detects the change of the output voltage level of the first sensor as an interrupt signal, the drive voltage level of the first sensor is switched from the first signal level to the second signal level which is different from the first signal level and the drive voltage level of the second sensor is switched from the second signal level to the first signal level which is different from the second signal level, and when the processor unit detects the change of the output voltage level of the second sensor as an interrupt signal, the drive voltage level of the second sensor is switched from the first signal level to the second signal level which is different from the first signal level and the drive voltage level of the first sensor is switched from the second signal level to the first signal level which is different from the second signal level.

* * * * *